(12) United States Patent
Groppa et al.

(10) Patent No.: US 10,235,806 B2
(45) Date of Patent: Mar. 19, 2019

(54) DEPTH AND CHROMA INFORMATION BASED COALESCENCE OF REAL WORLD AND VIRTUAL WORLD IMAGES

(71) Applicant: Rockwell Collins, Inc., Cedar Rapids, IA (US)

(72) Inventors: Danilo P. Groppa, Orlando, FL (US); Loyal J. Pyczynski, Celebration, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 342 days.

(21) Appl. No.: 14/550,050

(22) Filed: Nov. 21, 2014

(65) Prior Publication Data

US 2016/0148429 A1    May 26, 2016

(51) Int. Cl.
| | |
|---|---|
| *G06T 19/00* | (2011.01) |
| *G09G 3/00* | (2006.01) |
| *G09G 5/02* | (2006.01) |
| *G06F 3/01* | (2006.01) |
| *G06F 3/147* | (2006.01) |
| *G06F 3/03* | (2006.01) |

(52) U.S. Cl.
CPC ............ *G06T 19/006* (2013.01); *G06F 3/011* (2013.01); *G06F 3/0304* (2013.01); *G06F 3/147* (2013.01); *G09G 3/003* (2013.01); *G09G 5/026* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 7,479,967 B2 | 1/2009 | Bachelder et al. | |
| 8,040,361 B2 | 10/2011 | Bachelder et al. | |
| 8,502,835 B1 * | 8/2013 | Meehan | G06T 19/006 345/633 |
| 2006/0188163 A1 * | 8/2006 | Elder | H04N 1/644 382/232 |

(Continued)

OTHER PUBLICATIONS

"My Hand in VR Using Oculus Rift + Ovrvision + Chroma-Key", video published on www.YouTube.com on May 7, 2014; http://youtu.be/mcc6Lb6ndm0 or http://www.youtube.com/watch?v=mcc6Lb6ndm0&feature=youtu.be; by User name "hecorni".

(Continued)

*Primary Examiner* — Peter Hoang
(74) *Attorney, Agent, or Firm* — Angel N. Gerdzhikov; Donna P. Suchy; Daniel M. Barbieri (57) ABSTRACT

Methods and systems for selectively merging real-world objects into a virtual environment are disclosed. The method may include: receiving a first input for rendering of a virtual environment, a second input for rendering of a real-world environment, and a depth information regarding the rendering of the real-world environment; identifying at least one portion of the rendering of the real-world environment that is within a depth range and differentiable from a predetermined background; generating a merged rendering including the at least one portion of the rendering of the real-world environment into the rendering of the virtual environment; and displaying the merged rendering to a user.

20 Claims, 5 Drawing Sheets

(56) References Cited

U.S. PATENT DOCUMENTS

| | | | | |
|---|---|---|---|---|
| 2009/0179824 A1* | 7/2009 | Tsujimoto | .......... | G02B 27/0025 |
| | | | | 345/7 |
| 2012/0127284 A1* | 5/2012 | Bar-Zeev | ............. | G02B 27/017 |
| | | | | 348/53 |
| 2012/0194517 A1* | 8/2012 | Izadi | ....................... | G06T 17/00 |
| | | | | 345/420 |
| 2012/0206452 A1* | 8/2012 | Geisner | ................ | G02B 27/017 |
| | | | | 345/419 |
| 2013/0328925 A1* | 12/2013 | Latta | ...................... | G09G 3/003 |
| | | | | 345/633 |
| 2014/0085330 A1* | 3/2014 | Sugita | .................... | G09G 5/377 |
| | | | | 345/629 |
| 2015/0146027 A1* | 5/2015 | Ramachandran | .. | H04N 5/23206 |
| | | | | 348/211.3 |

OTHER PUBLICATIONS

David Szondy, NASA trains pilots with Fused Reality, GizMag, Sep. 30, 2015, 5 pages, Printed online at http://www.gizmag.com/nasa-fused-reality-train-pilots/39650/.

* cited by examiner

DEPTH AND CHROMA INFORMATION BASED COALESCENCE OF REAL WORLD AND VIRTUAL WORLD IMAGES

BACKGROUND

A virtual world (may also be referred to as virtual reality, virtual environment, or synthetic environment) is a computer-based simulated environment. Virtual reality is often used for various types of gaming as well as training purposes. For instance, a fully immersive virtual reality that uses a head-mounted display (HMD) allows a user to train through a wide variety of terrains, situations and scenarios. Virtual reality may also be used in flight simulations and various other training operations.

SUMMARY

Embodiments of the inventive concepts disclosed herein are directed to a method for selectively merging real-world objects into a virtual environment. The method may include: receiving a first input for rendering of a virtual environment, a second input for rendering of a real-world environment, and a depth information regarding the rendering of the real-world environment; identifying at least one portion of the rendering of the real-world environment that is within a depth range and differentiable from a predetermined background; generating a merged rendering including the at least one portion of the rendering of the real-world environment into the rendering of the virtual environment; and displaying the merged rendering to a user.

In one aspect, embodiments of the inventive concepts disclosed herein are directed to an apparatus. The apparatus may include at least one input port configured to receive a first input for rendering of a virtual environment, a second input for rendering of a real-world environment, and a depth information regarding the rendering of the real-world environment. The apparatus may also include an image processor. The image process may be configured to: identify at least one portion of the rendering of the real-world environment that is within a depth range and differentiable from a predetermined background; generate a merged rendering including the at least one portion of the rendering of the real-world environment and the rendering of the virtual environment; and provide the merged rendering for display to a user.

In a further aspect, embodiments of the inventive concepts disclosed herein are directed to a system. The system may include an image processor. The image processor may be configured to: receive a first input for rendering of a virtual environment, a second input for rendering of a real-world environment, and a depth information regarding the rendering of the real-world environment; identify at least one portion of the rendering of the real-world environment that is: within a depth range and differentiable from a predetermined background; and generate a merged rendering including the at least one identified portion of the rendering of the real-world environment and the rendering of the virtual environment. The system may also include a display device coupled with the image processor. The display device may be configured to display the merged rendering to a user.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

A head-mounted display or helmet mounted display, both abbreviated HMD, is a display device, worn on the head or as part of a helmet, that has a display device in front of one or both eyes of a user. HMDs may be used for gaming, training, and various types of simulations. Such simulations may cover a wide range of applications including driving, flying, combat training, medical procedure training and more.

It is noted, however, that using a HMD may obstruct the view of real-world objects. For example, a soldier wearing a HMD for training purposes may not be able to view his/her hands, feet, or any equipment he/she is physically handling in the real world. Obstruction of such real-world objects may result in a loss of immersion, realism, and sense of presence and may sometimes require the user to take the HMD off to use equipment in the real world. Repetitive removing and replacing the HMD induces negative training.

Embodiments of the inventive concepts disclosed herein may selectively bring rendering of real-world objects into a virtual world. More specifically, video stream(s) of real-world objects as they would be viewed from the perspective of a user are selectively merged in real-time with video stream(s) of the virtual environment that is being presented to the user, allowing the user to see and use real-world objects while being immersed in the virtual environment without needing to remove the display device (e.g., HMD). The ability to merge real world objects with the virtual world also allows haptic and tactile feedback to be presented to the user effectively.

Figure 1:
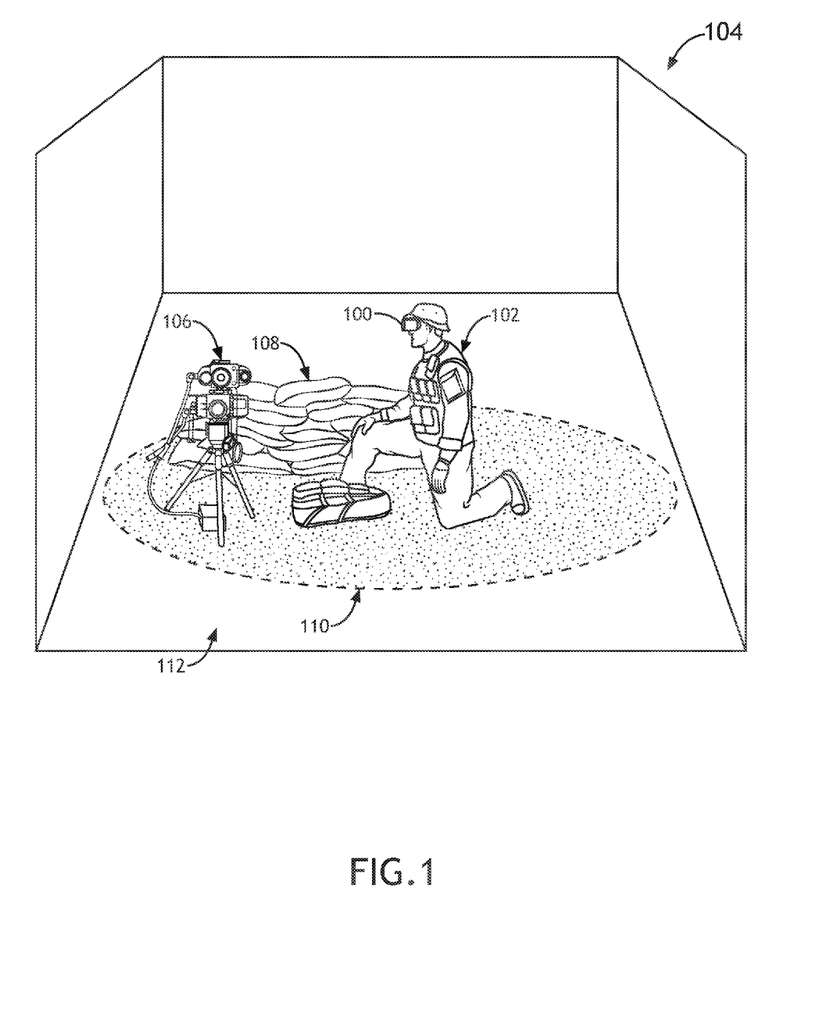
FIG. 1 is an illustration depicting a head mount display used by a user inside a training facility.

Referring to FIG. 1, an illustration depicting a HMD 100 used by a user 102 inside a training facility 104 is shown. The training facility 104 may include a training room as depicted in FIG. 1. For purposes of presentation simplicity, the training facility 104 is depicted as a rectangular room; it is to be understood, however, that the training facility 104 may be of different sizes and/or shapes. It is also to be understood that the training facility 104 may be located outdoors without departing from the broad scope of the inventive concepts disclosed herein.

Embodiments of the inventive concepts disclosed herein may selectively bring real-world objects physically located in the training facility 104 into the virtual environment that is being presented to the user 102 via the HMD 100. For example, if the training exercise requires the user 102 to operate a rangefinder 106 present in the training facility 104, it may be desirable to merge the video image of the rangefinder 106 as viewed from the perspective of the user 102 with the virtual environment that is being presented to the user 102. It may also be desirable to merge video images of other real-world objects (e.g., sandbags 108 present in the training facility 104) in proximity to the user 102 into the virtual environment. However, certain real-world objects (e.g., training room walls) located farther away from the user 102 may be excluded and refrained from merging into the virtual environment.

Figure 2:
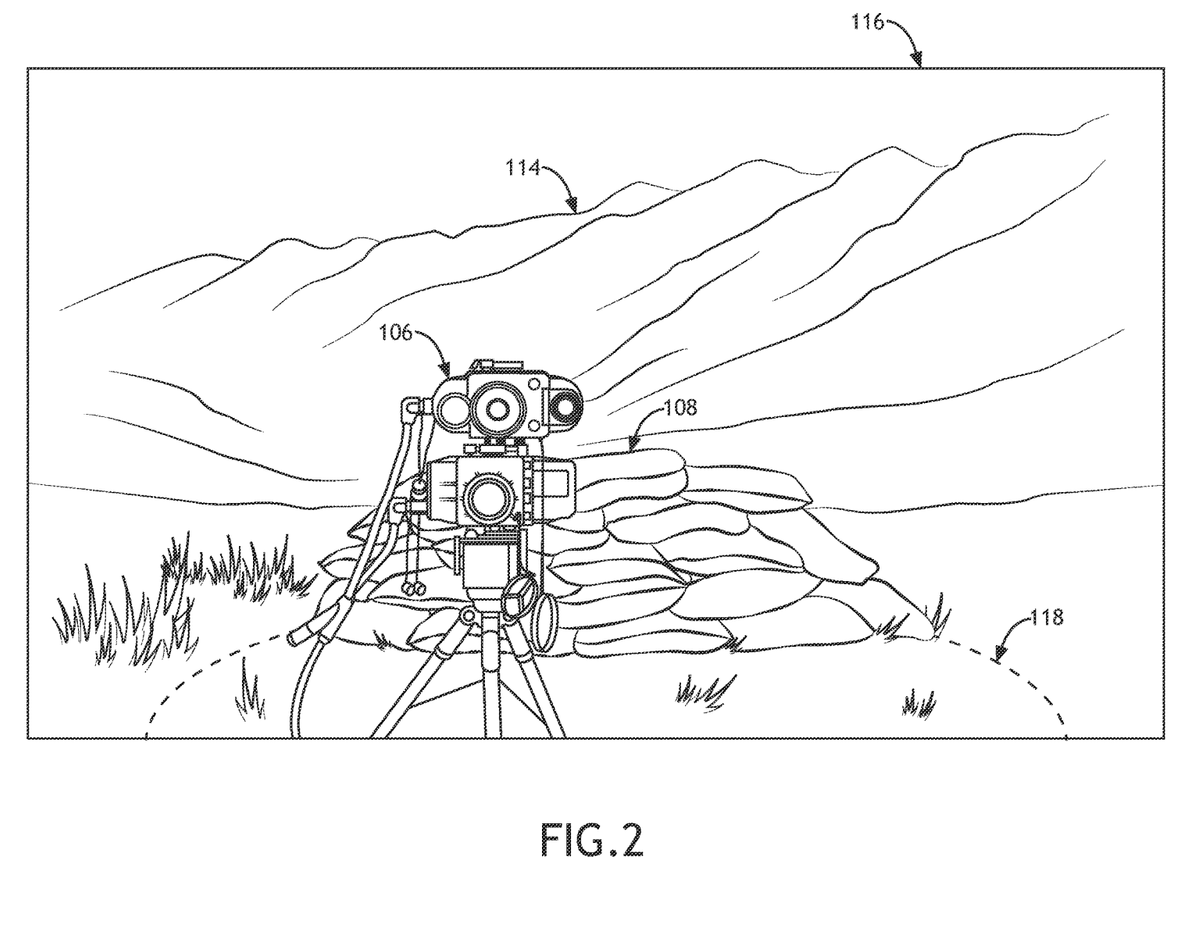
FIG. 2 is an illustration depicting a merged view as presented to the user.

FIG. 2 is an illustration depicting a merged view 116 as presented to the user 102. It is to be understood that certain HMDs are capable of presenting stereo images to both eyes of the user 102; however, for purposes of presentation simplicity, only one of such merged images is shown. It is contemplated that similar merging techniques disclosed herein may be applicable to two-dimensional, three-dimensional, stereo, and various other types of images (or video streams) without departing from the broad scope of the inventive concepts disclosed herein.

As depicted in FIG. 2, a virtual environment 114 is presented to the user 102 via the HMD 100. Also presented to the user 102 via the HMD 100 are the renderings of the rangefinder 106 and sandbags 108 as viewed from the perspective of the user 102. Providing renderings of the rangefinder 106 and sandbags 108 as viewed from the perspective of the user 102 may be implemented by placing one or more cameras on or adjacent to the HMD 100 to simulate the viewing angles of the user's eyes. Images (or video streams) obtained utilizing such cameras may then be processed and superimposed onto the virtual environment 114 in real-time to produce the exemplary merged view 116 to the user 102 as shown in FIG. 2.

It is noted that physical objects that are located a certain distance away (e.g., training room walls) from the user 102 are automatically excluded from the merged view 116 by utilizing depth information observed from the perspective of the user 102. Depth information may be utilized in some embodiments to determine whether a particular physical object should be included in or excluded from the merged view 116. More specifically, if a particular physical object is greater than a certain distance away from the user 102, that particular physical object is considered to be outside of the depth range and can be automatically excluded from the merged view 116.

It is contemplated that depth information may be obtained utilizing various different techniques. For instance, depth information (may also be referred to as depth map) may be generated in real-time using stereoscopic cameras located on or adjacent to (generally referred to as being co-located with) the HMD 100. Such a depth map may also be generated utilizing range imaging solutions such as time-of-flight, structure light, stereo triangulation or narrow depth field techniques and the like. Additionally and/or alternatively, a depth map may be generated in real-time using a pre-captured three-dimensional spatial data, such as room point cloud/mesh rendered in real-time with the current HMD head pose (taking into account head position and tracking information). It is contemplated that the depth information may be obtained utilizing other techniques not specifically mentioned above without departing from the broad scope of the inventive concepts disclosed herein.

While utilizing the depth information as described above enables real-time exclusion of physical objects that are outside of the depth range from being merged into the merged view 116, it may be desirable to further exclude certain real-world objects even if they are located within the depth range. For instance, it may be desirable to exclude the images of the training room floor where the user 102 is physically located. Referring back to FIG. 1, suppose that an area of the floor labeled 112 is outside of the depth range, the area 112 is excluded from the merged view 116 automatically. It is noted, however, that an area of the floor labeled 110 may be considered to be within the depth range, and therefore, additional processing may be carried out to exclude the corresponding images of the area 110 from the merged view 116.

In some embodiments, one or more predetermined color hues (chroma ranges/keys) may be utilized to cover the objects that are inside the depth range but are unwanted in the merged view 116. Objects that are inside the depth range but are unwanted in the merged view 116 may be generally referred to as background information, and the technique generally referred to as color keying or chroma keying may be utilized to effectively exclude such background information. Referring to the example shown in FIG. 1, the area of the floor labeled 110 may be painted in a particular chroma key color, allowing it to be readily differentiable from the rangefinder 106 and the sandbags 108. In some embodiments, a visual indicator 118 may be provided in the merged view 116 (as shown in FIG. 2) to visually indicate to the user 102 the boundary between areas 110 and 112. It is to be understood, however, that the visual indicator 118 is not required, and that the visual indicator 118 may be toggled on and off by the user as desired in some embodiments.

It is contemplated that other digital image processing techniques may also be utilized in addition (or alternative) to the utilization of chroma keys. For instance, the training facility 104 may be pre-scanned to record/map objects that are a part of the training facility 104 (generally referred to as the background environment). Additional objects introduced to the training facility 104 after the scanning process may then be identified as being differentiable from the pre-scanned background environment. It is contemplated that specific implementations of digital image processing techniques utilized for differentiating real-world objects from a background environment may vary without departing from the broad scope of the inventive concepts disclosed herein.

It is noted that while the specific implementations may vary, three basic rules for selectively merging real-world objects physically located in the training facility 104 into the virtual environment are observed in some embodiments of the inventive concepts disclosed herein. To reiterate, the three basic rules are:

a) Objects located outside of the defined depth range are excluded from the merged view 116;

b) Objects located inside the defined depth range and identified as a part of the background (e.g., objects in a particular chroma key color) are also excluded from the merged view 116; and c) Objects located inside the defined depth range but not identified as a part of the background are rendered and included in the merged view 116.

Figure 3:
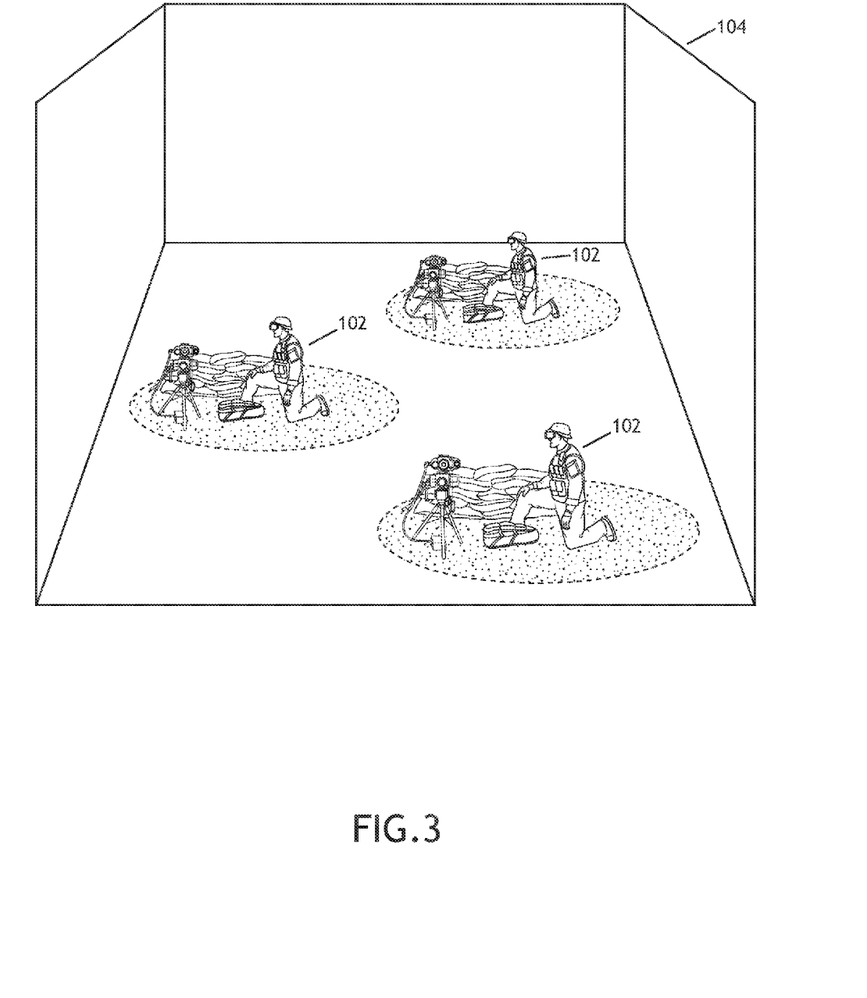
FIG. 3 is an illustration depicting multiple users inside the same training facility.

It is noted that all three basic rules are at least partially based on the defined depth range (or the depth information in general). Utilizing the depth information in this manner provides several advantages. For instance, since objects that are located outside of the defined depth range are automatically excluded from the merged view, only a small area inside the defined depth range needs to be processed for purposes of background removal. This also allows multiple users 102 to simultaneously use the training facility 104, as shown in FIG. 3, as long as the users 102 are at least one depth range away from each other. Conversely, it may be desirable in certain training scenarios to show multiple users 102 within the same merged view 116, thus they would be included within the depth range in a training facility. It is contemplated that the depth range may be predetermined, user-configured, training situation specific, or dynamically adjusted, or combinations thereof. It is also contemplated that users 102 may also use omnidirectional treadmills painted in a chroma key color to provide even more realistic solution with run/walk capabilities in some embodiments.

It is further contemplated that the techniques for selectively merging real-world objects into virtual environments are not limited to combat training applications. Similar techniques are applicable to various types of flight and vehicle simulations, and may be utilized to provide visual and tactile feedbacks for users in various situations and for performing various tasks such as driving, flying, medical procedure training and more.

Figure 4:
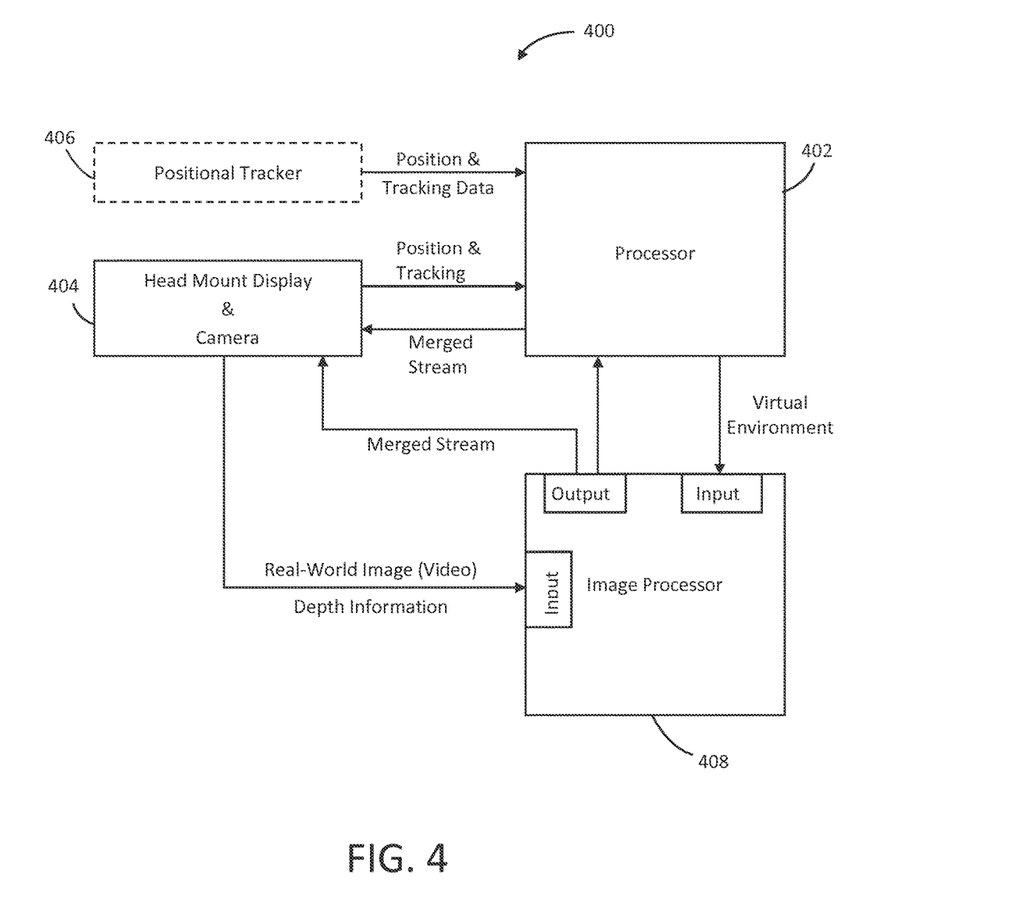
FIG. 4 is a block diagram depicting an embodiment of a system for selectively merging real-world objects into a virtual environment.

Referring now to FIG. 4, a block diagram depicting an embodiment of a system 400 for selectively merging real-world objects into a virtual environment is shown. A processor 402 is utilized for generating the virtual environment, which may be utilized for various purposes such as gaming, training, simulation and the like. The processor 402 is in communication with a display device 404, such as a head mount display (or HMD), which is configured to present images (may also be referred to as video streams) to one or more users. The display device 404 may include one or more positional trackers configured to track head position and movements. Alternatively/additionally, auxiliary positional trackers 406 may be utilized for tracking purposes.

One or more cameras are located on or adjacent to the display 404 and are configured to obtain real-world images that generally match the field of view of the display 404 (e.g., HMD). In some embodiments, the cameras may also be configured to obtain depth information along with the images they obtain. Alternatively (or additionally), additional cameras or sensors may be utilized to obtain the depth information. The obtained real-world images and depth information are jointly processed to determine whether any portions of the obtained real-world images should be merged into the virtual environment or not.

In some embodiments, a dedicated image processor hardware 408 is utilized to receive input for rendering of the virtual environment (generated by the processor 402) and input for rendering of the real-world objects (obtained from the cameras 404) and process the received input to generate a merged video stream. A dedicated image processor 408 is utilized to minimize any latency that may be associated with image processing. For example, it may be desirable to reflect a user's head movement in the merged stream within 20 milliseconds after the movement has occurred in real-world; if the latency is more than 25 milliseconds, the user may experience motion sickness or other undesirable conditions. It is contemplated, however, that the utilization of dedicated hardware is not required, and image processing may be performed by the processor 402 without departing from the broad scope of the inventive concepts disclosed herein.

Regardless of whether the image processor 408 is implemented as a dedicated hardware or an embedded component, the purpose of the image processor 408 is to selectively merge real-world objects into the virtual environment based on the depth and chroma information as previously described. The merged stream may then be provided to the display device 404 and presented to the user.

Figure 5:
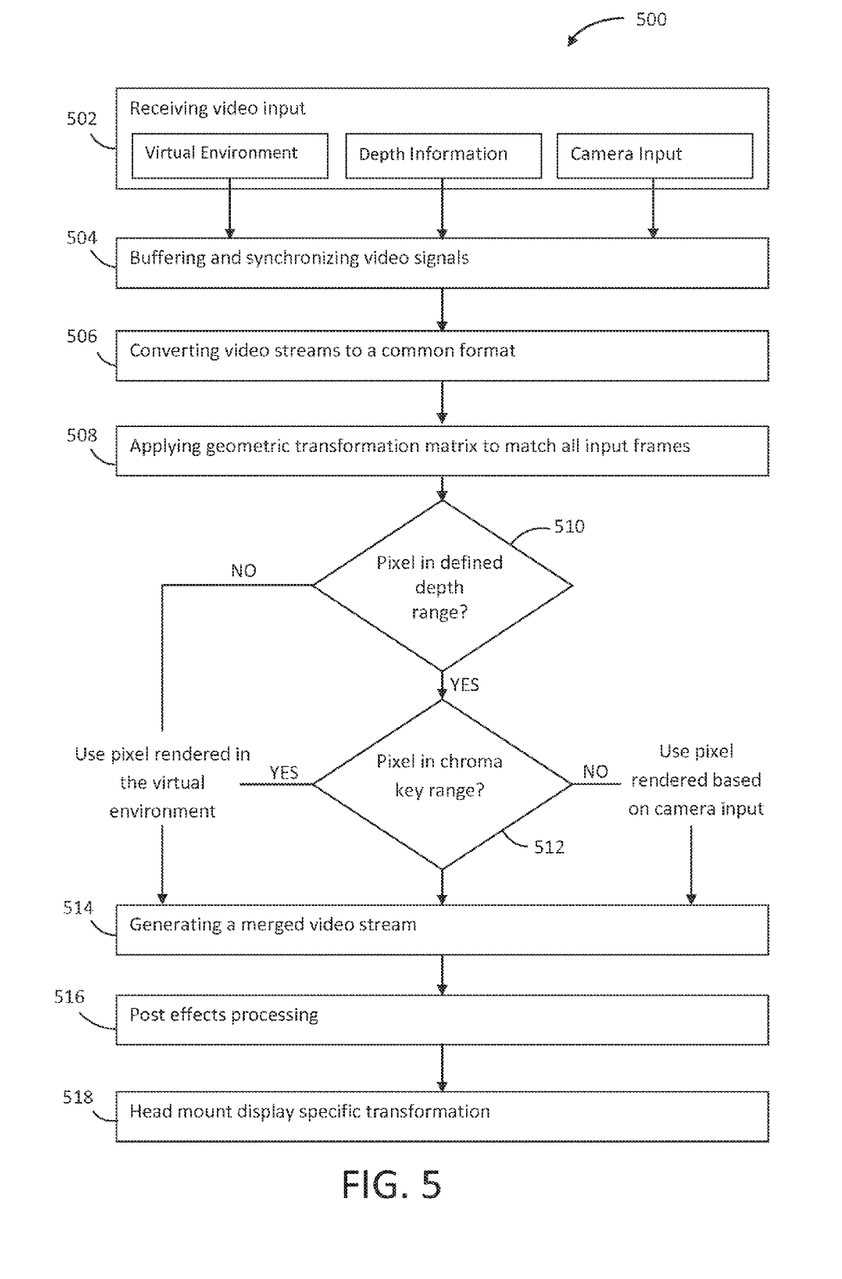
FIG. 5 is a flow diagram depicting an embodiment of a method for selectively merging real-world objects into a virtual environment.

Referring now to FIG. 5, a flow diagram depicting an embodiment of a method 500 for selectively merging real-world objects into a virtual environment is shown. In a step 502, video input signals are received from different sources. The received signals may include video input for rendering a virtual environment, video input of a real-world environment, as well was the depth information/mapping of the real-world environment. The received signals may be buffered and synchronized in a step 504 based on time information associated with each signals, and then converted in a step 506 to a common format that can be subsequently processed. It is contemplated that the format may be chosen based on specific requirement such as resolution, compression rate, available processing power, as well as other factors without departing from the broad scope of the inventive concepts disclosed herein.

In some embodiments, geometric transformation is applied to match all input to a common two-dimensional surface perspective for processing in a step 508. Each pixel location in the two-dimensional frames may then be processed based on the merging rules previously defined. More specifically, if a pixel location corresponds to an area that is determined (determination step 510) to be outside of a defined depth range, the pixel location should be rendered based on video input for rendering the virtual environment. On the other hand, if a pixel location corresponds to an area that is determined to be within the defined depth range, a further determination step 512 is invoked to determine whether the camera input at this pixel location corresponds to an unwanted background image (e.g., within a chroma key range). If the camera input at this pixel location indeed corresponds to an unwanted background image (e.g., the pixel is in the chroma key range), the pixel location should be rendered based on video input for the virtual environment. Otherwise, the pixel location should be rendered based on the camera input, effectively bringing real-world images into the frame.

Once it is determined which video input (virtual or real) should be used for each pixel location, a merged video stream may be generated accordingly in a step 514. It is to be understood that while the example above described image processing at a pixel level, in certain embodiments, a set of adjacent pixels may be processed jointly as a unit in a similar manner. It is contemplated that the granularity of this processing step may be determined based on various factors such as resolution, available processing power, as well as other factors without departing from the broad scope of the inventive concepts disclosed herein.

It is also contemplated that additional post processing effects may be applied in a step 516. For example, effects such as nigh vision goggle, thermal imaging, as well as other types of visual effects may be introduced. It is further contemplated that if a head mount display is used, certain HMD specific transformations may be applied and displayed in a step 518. Such transformations may include, for example, geometry lens distortions, corrections for chromatic aberrations, multisampling, resizing and the like. It is contemplated, however, that utilization of a HMD is not required, and that the display device may be a two-dimensional, three-dimensional, stereo, or various other types of display devices without departing from the broad scope of the inventive concepts disclosed herein.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software, firmware, and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the inventive concepts disclosed herein. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
   pre-scanning a real-world environment to identify background objects in the real-world environment;
   receiving a first input for rendering of a virtual environment, a second input for rendering of the real-world environment, and a depth information regarding the rendering of the real-world environment;
   identifying at least one portion of the rendering of the real-world environment that is in proximity to a user, is within a depth range, and is differentiable from a chroma-based predetermined background and differentiable from the background objects identified by pre-scanning the real-world environment;
   applying at least one geometric transformation to transform the first input for rendering of the virtual environment, the second input for rendering of the real-world environment, and the depth information regarding the rendering of the real-world environment to pixel locations within two-dimensional image frames, wherein at least a second portion of the rendering of the real-world environment is excluded based on depth information associated with a portion of the pixel locations indicating that the portion of the pixel locations is beyond the depth range, wherein the at least one geometric transformation includes a transformation to correct geometry lens distortions and a transformation to correct for chromatic aberrations;
   generating a merged rendering including the at least one portion of the rendering of the real-world environment into the rendering of the virtual environment and excluding the at least the second portion of the rendering of the real-world environment from the rendering of the virtual environment, the excluding being based on the at least the second portion of the rendering being beyond the depth range and not in proximity to the user; and
   displaying the merged rendering to the user.

2. The method of claim 1, wherein the second input for rendering of the real-world environment is obtained from a perspective of the user and the depth range is defined as a distance measurement that is measured with respect to the user.

3. The method of claim 1, wherein at least one chroma key is utilized to facilitate the identification of the at least one portion of the rendering of the real-world environment that is differentiable from the chroma-based predetermined background.

4. The method of claim 1, further comprising:
   synchronizing the first input for rendering of the virtual environment, the second input for rendering of the real-world environment, and the depth information regarding the rendering of the real-world environment based on time; and
   including at least a third portion of the rendering of the real-world environment into the rendering of the virtual environment, wherein the at least a third portion includes first objects from the real-world environment at a first time that are differentiated from second objects in the real-world environment at a second time, the first time and the second time being utilized to facilitate the identification of the included first objects of the at least the third portion of the rendering of the real-world environment.

5. The method of claim 1, further comprising:
   converting the first input for rendering of the virtual environment, the second input for rendering of the real-world environment, and the depth information regarding the rendering of the real-world environment to a common format for image processing.

6. The method of claim 1, wherein the rendering of the virtual environment and the rendering of the real-world environment are stereo video renderings formatted for being presented utilizing a head-mounted display.

7. An apparatus, comprising:
   at least one input port configured to receive a first input for rendering of a virtual environment, a second input for rendering of a real-world environment, and a depth information regarding the rendering of the real-world environment; and
   an image processor configured to perform the following steps:
   pre-scan the real-world environment to identify background objects in the real-world environment;
   identify at least one portion of the rendering of the real-world environment that is in proximity to a user, is within a depth range, and is differentiable from a chroma-based predetermined background and differentiable from the background objects identified by pre-scanning the real-world environment;
   apply at least one geometric transformation to transform the first input for rendering of the virtual environment, the second input for rendering of the real-world environment, and the depth information regarding the rendering of the real-world environment to pixel locations within two-dimensional image frames, wherein at least a second portion of the rendering of the real-world environment is excluded based on depth information associated with a portion of the pixel locations indicating that the portion of the pixel locations is beyond the depth range, wherein the at least one geometric transformation includes at least one of a transformation to correct geometry lens distortions;

generate a merged rendering including the at least one portion of the rendering of the real-world environment and the rendering of the virtual environment and excluding the at least the second portion of the rendering of the real-world environment from the rendering of the virtual environment, the excluding being based on the at least the second portion of the rendering being beyond the depth range and not in proximity to the user; and provide the merged rendering for display to the user.

8. The apparatus of claim 7, further comprising:
an output port configured to provide the merged rendering to a display device.

9. The apparatus of claim 8, wherein the display device includes a head-mounted display, and wherein the merged rendering is a stereo video rendering formatted for being presented utilizing the head-mounted display.

10. The apparatus of claim 9, wherein the second input for rendering of the real-world environment is obtained from at least one camera co-located with the display device.

11. The apparatus of claim 7, wherein the rendering of the virtual environment and the rendering of the real-world environment are video streams.

12. The apparatus of claim 7, wherein the image processor is further configured to:
remove at least a third portion of the rendering of the real world environment, wherein the chroma-based predetermined background includes at least one predetermined color hue and the at least a third portion is removed based on the at least one predetermined color hue.

13. The apparatus of claim 7, wherein the at least one geometric transformation further includes a transformation to correct for chromatic aberrations, multisampling, and resizing.

14. A system, comprising:
an image processor configured to:
pre-scan a real-world environment to identify background objects in the real-world environment;
receive a first input for rendering of a virtual environment, a second input for rendering of the real-world environment, and a depth information regarding the rendering of the real-world environment and differentiable from the background objects identified by pre-scanning the real-world environment;
identify at least one portion of the rendering of the real-world environment that is: in proximity to a user, within a depth range, and differentiable from a chroma-based predetermined background;
apply at least one geometric transformation to transform the first input for rendering of the virtual environment, the second input for rendering of the real-world environment, and the depth information regarding the rendering of the real-world environment to pixel locations within two-dimensional image frames, wherein at least a second portion of the rendering of the real-world environment is excluded based on depth information associated with a portion of the pixel locations indicating that the portion of the pixel locations is beyond the depth range, wherein the at least one geometric transformation includes a transformation to correct for chromatic aberrations; and
generate a merged rendering including the at least one identified portion of the rendering of the real-world environment and the rendering of the virtual environment and excluding the at least the second portion of the rendering of the real-world environment from the rendering of the virtual environment, the excluding being based on the at least the second portion of the rendering being beyond the depth range and not in proximity to the user; and
a display device coupled with the image processor and configured to display the merged rendering to the user.

15. The system of claim 14, wherein the display device includes a head-mounted display device, wherein the merged rendering is a stereo video rendering suitable for being presented utilizing the head-mounted display.

16. The system of claim 15, wherein the head-mounted display device is utilized to provide fully immersive training for the user.

17. The system of claim 14, wherein the second input for rendering of the real-world environment is obtained from a perspective of the user utilizing at least one camera co-located with the display device.

18. The system of claim 17, wherein the depth information regarding the rendering of the real-world environment is obtained from the perspective of the user utilizing the at least one camera.

19. The system of claim 17, wherein the depth information regarding the rendering of the real-world environment is obtained from the perspective of the user utilizing at least one of: a depth camera, a disparity map generated from two stereo cameras, and a set of pre-captured three-dimensional spatial data.

20. The system of claim 14, wherein the image processor is further configured to:
remove at least a third portion of the rendering of the real world environment, wherein the chroma-based predetermined background includes at least one predetermined color hue and the at least a third portion is removed based on the at least one predetermined color hue.

* * * * *